Figure 1:
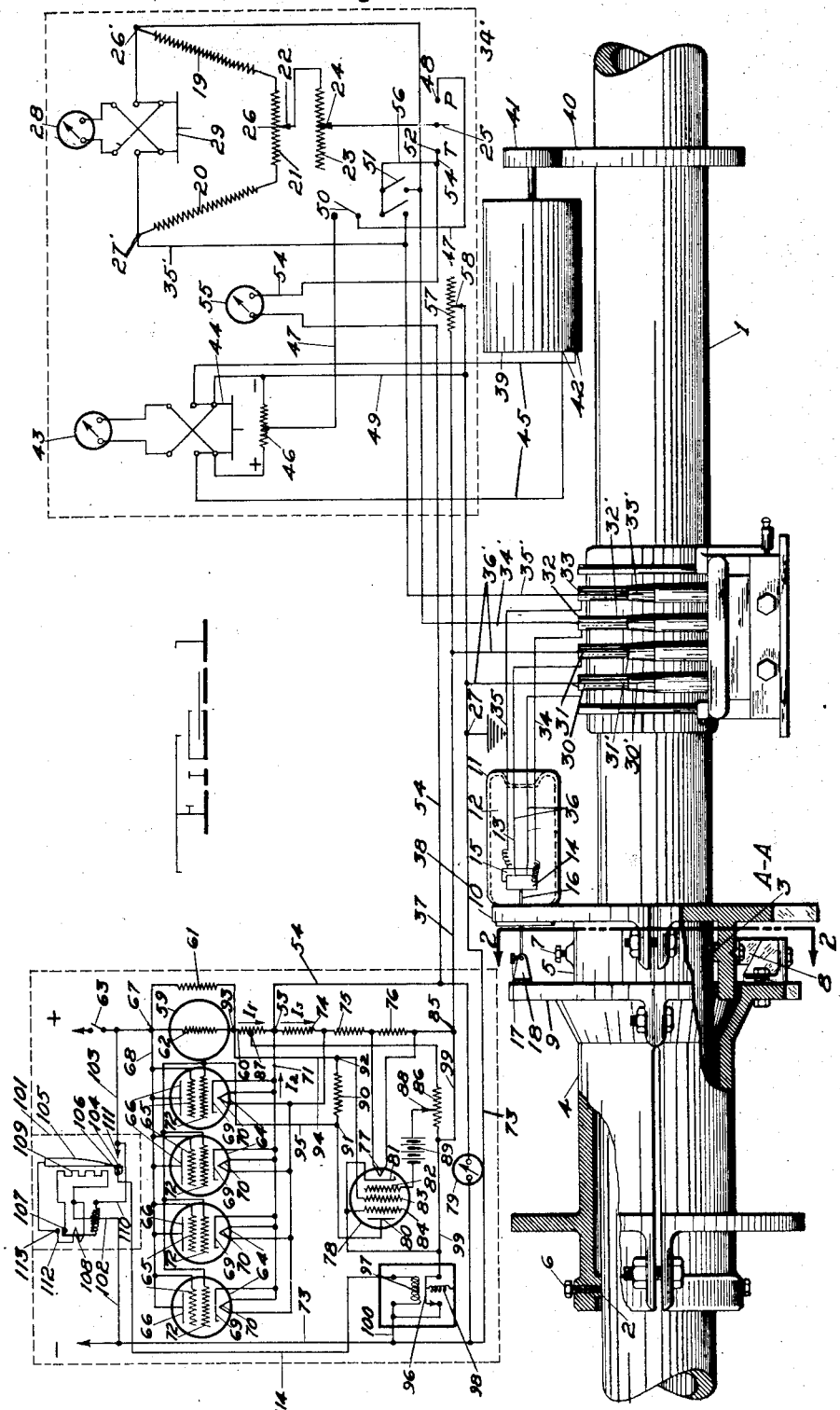

April 14, 1942.  W. C. HALL  2,279,313
VOLTAGE REGULATOR
Original Filed Jan. 26, 1940   2 Sheets-Sheet 1

INVENTOR
Wayne C. Hall
BY
ATTORNEY

April 14, 1942.  W. C. HALL  2,279,313
VOLTAGE REGULATOR
Original Filed Jan. 26, 1940  2 Sheets-Sheet 2

INVENTOR
Wayne C Hall
BY
ATTORNEY

Patented Apr. 14, 1942

2,279,313

UNITED STATES PATENT OFFICE 2,279,313

VOLTAGE REGULATOR

Wayne C. Hall, Washington, D. C.

Original application January 26, 1940, Serial No. 315,722. Divided and this application November 29, 1940, Serial No. 367,719

9 Claims. (Cl. 171—229)

(Granted under the act of March 3, 1883, as amended April 30, 1928; 370 O. G. 757)

My invention relates to a voltage regulator and to an apparatus for measuring mechanical power and/or torque. The present application is a division of my application Serial No. 315,722 filed January 26, 1940. In the parent application the novel features of the power and/or torque measuring apparatus are claimed, while the claims of the present application are limited to the novel features of the voltage regulator.

The regulator of the present invention is adapted for use with the power and/or torque meter which includes in combination with a power shaft, a space discharge device comprising an envelope enclosing at least three electrodes at least one of which is electron emissive and at least one of which is movable with respect to the envelope. The envelope of the space discharge device and at least the movable electrode thereof are secured to the shaft at spaced points therealong in such a manner as to cause an increase in resistance between a plurality of the electrodes simultaneously with a decrease in a like resistance upon subjecting the shaft to a torsional deflection. The magnitude of this simultaneous variation in the interelectrode resistances is, therefore, approximately proportional to the torque being transmitted by the shaft.

The space discharge device is connected in a bridge circuit to form two branches or arms thereof, which circuit is normally in a state of balance when no power or torque is being transmitted by the shaft. Where it is desired to measure the mechanical power under transmission, a generator, the voltage output of which is proportional to the speed of the shaft, is utilized and is driven by the shaft at a speed equal to or proportional to that of the shaft. This generator is connected across a diagonal of the bridge circuit while an electrical instrument for directly and continuously indicating a quantity that is proportional to both the torque and speed of the shaft is connected across the remaining bridge diagonal. The connection of the generator as aforesaid makes the provision of any further voltage sources for power measurements unnecessary and thus results in the production of a highly economical and compact apparatus. For indicating the torque under transmission, an instrument is likewise employed in one bridge diagonal that will directly and continuously indicate a quantity which is proportional to the torque of the shaft, while a voltage that is independent of the shaft speed is substituted for that of the generator in the other bridge diagonal.

Where a qualitative indication of transmitted shaft power or torque is desired, it is not necessary to maintain the emissivity of the electron emissive electrode of the space discharge device or the voltage across the bridge diagonal that is independent of shaft speed constant. On the other hand, where a precision or quantitative indication of transmitted power or torque is desired, the electron emissivity and voltage referred to must be maintained substantially constant although if the reading of the apparatus may be permitted to be in error by a few percent, these quantities may be allowed to vary from the established mean value by a few percent. Any substantial deviation, however, in the constancy of these quantities from predetermined values will so effect the sensitivity of the indicating instrument across one of the bridge diagonals as to nullify any previous calibration of the apparatus.

For maintaining a substantially constant electron emissivity and a substantially constant voltage across one diagonal of the bridge circuit when desired, I have devised a novel regulatory system for regulating a fluctuating source of direct current electromotive force which, while of general application, may be advantageously utilized in the power and/or torque meter. This regulatory system includes a fluctuating source of direct current electromotive force connected in circuit with a plurality of parallel branches and a branch across which it is desired to maintain a substantially constant voltage drop. Means responsive to any current change in one parallel branch attending any fluctuation in the direct current electromotive force causes a substantially equal but opposite current change in the other parallel branch, whereby the current in the remaining circuit branch and hence the voltage drop thereacross is maintained substantially constant. By connecting the electron emissive electrode of the space discharge device in the latter or remaining circuit branch, it will be energized by a substantially constant current at all times thus maintaining a substantially constant electron emissivity. This latter circuit branch also provides a substantially constant source of electromotive force for one diagonal of the bridge circuit when employing the apparatus for the measurement of torque.

In the light of the foregoing it is the principal object of my invention to provide a novel regulatory system of general application for use with a power and/or torque meter to insure quantitative or precision indications of the transmitted shaft power or torque.

Figure 2:
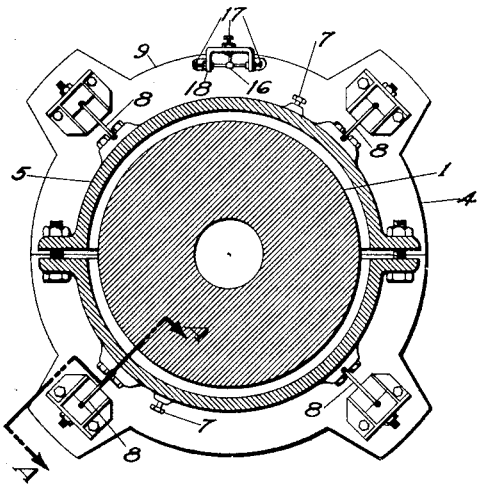
Figure 3:
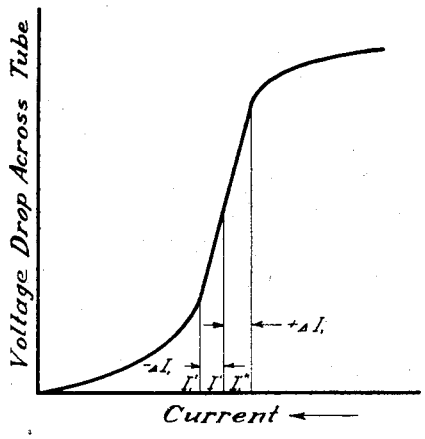
Figure 4:
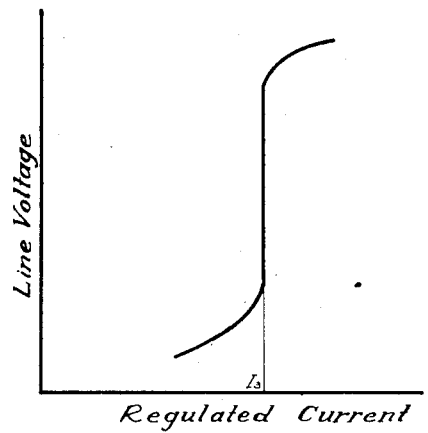

Other objects and many of the attendant advantages of this invention will be readily appreciated as the same becomes better understood by reference to the following detailed description when considered in connection with the accompanying sheets of drawings wherein:

Fig. 1 discloses the preferred embodiment of the apparatus of my invention for measuring transmitted shaft power and/or torque, showing, among other things, the space discharge device associated with the power shaft connected in the bridge circuit for forming two branches thereof together with the novel regulatory system;

Fig. 2 is an enlarged sectional view taken on the line 2—2 of Fig. 1 showing in greater detail, among other things, the construction employed for maintaining a concentric relationship between the shaft encircling sleeves that engage the space discharge device;

Fig. 3 is the current-voltage characteristic of the ballast tube which is included in one of the parallel branches of the regulatory system showing how the current in this branch varies in response to any change in the fluctuating source of direct current electromotive force; and Fig. 4 is the current-voltage characteristic of that branch of the regulatory system across which it is desired to maintain a substantially constant voltage drop showing how the current in this branch varies in response to any change in the fluctuating source of direct current electromotive force.

Before proceeding to a detailed description of the preferred embodiment of my invention it is desired, among other things, to make certain general remarks regarding the space discharge device associated with the power shaft so as to insure clarity in the subsequent exposition. As noted hereinbefore, this space discharge device comprises an envelope enclosing at least three electrodes, at least one of which is electron emissive to thus serve as a cathode and at least one of which is movable with respect to the envelope.

While a cursory examination of Fig. 1 of the drawings shows the cathode of the space discharge device associated with the power shaft as of the thermionic type, it is to be understood that other types of cathodes may be employed.

The envelope of this space discharge device, which is fashioned from any of the materials known to the prior art and serves to enclose the electrodes, may be evacuated to produce a high vacuum and thus insure a substantially pure electron discharge or may alternatively be provided with a suitable filling of a gas or vapor, gases or vapors, or mixtures of gases and vapors at a selected pressure or pressures to insure the desired operating characteristics.

Finally, and of great importance, it is essential that the meaning of the term "sensitivity" be understood as used with respect to the electrical indicating instrument connected across one of the bridge diagonals. As here employed, the term "sensitivity" designates the indication or incremental change in the reading of the instrument per unit deflection of the movable electrode of the space discharge device. The sensitivity of the indicating instrument is a function of the electromotive force impressed across one of the bridge diagonals, as well as a function of the emissivity of the cathode of the space discharge device associated with the power shaft.

Turning now to Figs. 1 and 2 of the drawings, there is shown depicted therein a rotatable shaft 1 having securely clamped thereto at spaced points 2 and 3 the sectionalized sleeves 4 and 5, one of which exceeds the other in length. The set screws 6 and 7 are employed at the respective points of securement of sleeves 4 and 5 to the shaft to make certain that no peripheral or longitudinal movement of the sleeves relative to the shaft will occur. The free end of the sleeve 4 is supported from and maintained concentric with the sleeve 5 by means of the tension members 8 constructed as thin flexible plates which offer no appreciable obstruction to rotational movement between the sleeves. These tension members are secured to the terminal portions of the sleeves in any suitable manner. It is thus evident that any angular or torsional deflection of the shaft intermediate the points of securement of the sleeves thereto upon the application of any torque will be transmitted to the flanges 9 and 10 of the respective sleeves 4 and 5 and cause them to be angularly displaced relative to each other by the same amount.

A space discharge device identified in general by the reference character 11 is shown, by way of example, as comprising an envelope 12 enclosing a thermionic cathode 13 stationarily mounted with respect to the envelope and interposed between a pair of conjointly movable anodes 14 and 15, the three electrodes being mounted for simultaneous cooperation and being disposed to cause an increase in one anode-cathode resistance simultaneously with a decrease in a like resistance. The two anodes 14 and 15 are rigidly secured to the elongated member or arm 16 and are electrically insulated from each other and from the arm in any suitable manner. The arm, as shown, extends from the envelope interior to a point exteriorly thereof and at its point of emergence is flexibly and hermetically sealed to the envelope by employment of any of the well-understood expedients known to the prior art.

The envelope 12 of the space discharge device is suitably mounted on the flange 10 of the sleeve 5, while the deflector arm 16 adjacent its outer extremity is laterally engaged by a series of set screws 17 (Fig. 2) supported by a bracket 18 secured to the flange 9 of the sleeve 4. Thus, it should be clear that any relative movement of the flanges 9 and 10 attending any angular or torsional deflection of the shaft will cause simultaneously a decrease in spacing between the first anode and the cathode and an increase in spacing between the second anode and cathode, the variation in spacing being directly proportional to the torque under transmission. In consequence of the foregoing, there will be produced an increase in one interelectrode resistance simultaneously with a decrease in a like resistance.

The space discharge device 11 is connected in a bridge circuit to form two branches or arms thereof, the remaining two branches being constituted by the two fixed resistors 19 and 20 and so much of the variable balancing resistor 21 as may be included therein by appropriate adjustment of the sliding contact 22. It is thus evident that the bridge may be initially balanced prior to any measuring operation by suitable manipulation of the sliding contact 22 associated with the balancing resistor 21. The variable resistor 23 under the control of the sliding contact 24 is connected to the switch 25 by means of which the desired electromotive force is impressed across one of the bridge diagonals. By varying the resistor 23, it is possible to vary slightly the voltage impressed across the bridge diagonal 26—27 one end of which, for convenience is grounded; and hence to vary the sensitivity of the electrical instrument or meter 28, which may be either of the voltage or current type, connected across the remaining bridge diagonal 26'—27' through the double-pole double-throw reversing switch 29. The variable resistor 23 is used primarily to vary the sensitivity of the meter 28 when employing the apparatus for the measurement of torque. Once, however, this resistor has been adjusted, the adjustment remains the same for both power and torque measurements. It is thus seen that the bridge circuit includes four arms or branches, two of which are constituted by the resistances between the anode 14, cathode 13 and anode 15, cathode 13 with the resistors 19 and 20 and so much of the variable resistor 21 that may be respectively associated therewith constituting the remaining two branches.

Since only the space discharge device 11 is secured to and rotates with the shaft 1, provision must be made for electrically connecting the same with the resistors 19 and 20 included in two of the branches of the bridge circuit and with suitable sources of electromotive force for energizing the bridge circuit and the thermionic cathode 13 of the space discharge device. To this end slip rings 30, 31, 32 and 33 are insulatingly mounted from each other and from the shaft 1 to rotate with the latter and cooperate respectively with brushes 30', 31', 32' and 33'. By means of this arrangement, a continuous electrical connection is provided between anodes 14, 15 and the respective resistors 19, 20 through conductors 34, 35 interconnecting anodes 14, 15 and slip rings 32, 33; and conductors 34', 35' interconnecting the brushes 32', 33' with the terminal portions 26', 27' of the respective resistors 19, 20. The thermionic cathode 13 is maintained in continuous electrical connection with a suitable source of electromotive force which is preferably, although not necessarily, supplied by the regulatory system to be described more in detail hereinafter. This interconnection is achieved by means of conductors 36 connecting the cathode and the slip rings 30 and 31; and the conductors 36' interconnecting the brushes 30' and 31' with the current mains 37 and 38 leading to the regulatory system. As connected, the cathode 13 is energized by a substantially constant current to insure a substantially constant electron emissivity.

A direct current generator 39, the voltage output of which is proportional to the shaft speed, is driven by the shaft 1 through a gear 40 rigidly secured thereto which is in meshing engagement with a pinion 41 securely mounted on the armature shaft. Thus, the electromotive force developed at the generator terminals 42 is directly proportional to the speed of the rotating power shaft which latter quantity may, if desired, be directly indicated by the standard type of voltmeter 43 calibrated in units of speed and associated with the double-pole double-throw switch 44 connected to the generator terminals 42 by means of the conductors 45.

The voltage developed at the generator terminals 42 is impressed upon the voltage dropping resistor 46 so that the fraction of the voltage thereof subsequently impressed across the bridge circuit may at no time be excessive. Where the voltage developed by the generator at the maximum speed of the power shaft is within the desired operating range, the voltage dropping resistor 46 may be dispensed with. The sensitivity of the indicating instrument 28 connected across the bridge diagonal 26'—27' is a linear function of the voltage impressed across the bridge diagonal 26—27 only so long as this voltage does not cause near saturation current to flow in the space discharge device 11 associated with the power shaft 1. To prevent a voltage in excess of this critical saturation voltage from being impressed across the bridge diagonal 26—27 at maximum shaft speed with the generator here employed, the dropping resistor 46 is utilized. This resistor insures that only the proper fraction of the electromotive force at maximum shaft speed is made available for subsequent application to the bridge circuit.

A conductor 47 connects a suitable point along the length of the dropping resistor 46, which is always maintained at a positive potential by the reversing switch 44, with the power contact 48 of the switch 25. The point of the dropping resistor 46 which is always maintained at a negative potential, as indicated, is connected by means of the conductor 49 to the current main 38 which is grounded at 27. A switch 50, when closed, establishes electrical continuity along the length of the conductor 47 and may, if desired, be interlocked with the single-throw double-pole switch 51. The function of this latter switch, as will be pointed out more in detail hereinafter, is to make possible the measurement of the saturation current of the space discharge device 11 associated with the power shaft when this is desired. These interlocking switches 50 and 51 are so arranged that when one is closed the other is open and vice versa. Normally, the single-pole single-throw switch 50 remains closed and the double-pole switch 51 in consequence thereof open. Thus, it should be clear that with the switch 50 closed and the switch 25 thrown to engage the power contact 48 that a fixed fraction of the variable electromotive force of the generator 39 will be impressed across the bridge diagonal 26—27 and that the apparatus as connected may now be employed for the measurement of transmitted shaft power.

By throwing the switch 25 from its position of engagement with the power contact 48 to a position of engagement with the torque contact 52, the apparatus is forthwith changed from a power measuring instrumentality to a device for measuring torque. Engagement of the switch 25 with the torque contact 52 has the effect of disconnecting the variable generator voltage from the bridge circuit and of substituting therefor a voltage which may or may not have a substantially constant value but whose value in any event is definitely independent of the shaft speed. In the preferred embodiment of the torque meter, the emissivity of the cathode 13 of the space discharge device 11 and the voltage impressed across the bridge diagonal 26—27 are maintained substantially constant. The connection of the cathode 13 is the same as that already described when using the apparatus for the measurement of power and may be such as to provide either a variable or a substantially constant electron emissivity.

The engagement of the switch 25 with the torque contact 52 has the effect of connecting the branch 53—27 of the regulatory system, across which there is maintained a substantially constant voltage drop, to the bridge circuit. Thus, there is maintained across the bridge diagonal 26—27 a substantially constant electromotive force. The foregoing is made possible by virtue of the conductor 54 which connects the upper point or point of positive polarity 53 of the aforesaid regulatory branch with the torque contact 52, a current meter 55 being in circuit with the conductor for a reason to be pointed out presently. The same meter 28 connected across the bridge diagonal 26'—27' may, if desired, be employed for indicating a quantity that is proportional to the torque under transmission.

In the preferred embodiment of my apparatus for the measurement of power and/or torque, it is desired to maintain the emissivity of the thermionic cathode 13 of the space discharge device 11 substantially constant. The electron emissivity of the cathode is a function of its surface condition and of its operating temperature. The temperature of the cathode is maintained at an initial and desired value by energizing the same with a substantially constant current furnished by the regulatory system. It may happen, however, that the surface condition of the thermionic cathode becomes impaired during the operating life of the space discharge device thus necessitating a slight increase or decrease in temperature of the cathode to restore the initial and desired value of electron emissivity. This is accomplished by energizing the cathode with a slightly higher or lower current, this new current value, however, being likewise maintained substantially constant by the regulatory system. To this end provision is made for checking the emissivity of the cathode and for restoring the same to its initial value of emissivity when this becomes necessary.

Switch 51, which is electrically connected to conductor 54 by the conductor 56, when closed connects the substantially constant source of electromotive force of the branch 53—27 of the regulatory system directly across the space discharge device, thus causing saturation current to flow which is a direct measurement of the emissivity of the cathode 13. The circuit thus completed by closure of the switch 51 extends from the junction 53 of the regulatory system through the conductor 54, meter 55 (which may be a milliammeter) and switch 51 to the brushes 32', 33' by virtue of the conductors 34', 35' connected respectively therewith. The circuit closed as aforesaid continues from the slip rings 32, 33 to their respective anodes 14, 15 through the conductors 34, 35 and from thence through the cathode 13, slip ring 30, brush 30' and conductor 36' to the remaining terminal 27 of the regulatory branch. Thus, it should be clear that when the check switch 51 is closed the effect is to short circuit the bridge resistors 19 and 20 and to cause the sum of the two plate currents of the space discharge device 11 or the saturation currents thereof to flow through the milliammeter 55.

Any change in the emissivity of the thermionic cathode 13 attending any change in its surface condition may be compensated for by causing a slight variation in current through the cathode, the new current value, however, being maintained substantially constant by the regulatory system. This is accomplished by suitably adjusting a variable resistor 57 in parallel with the cathode 13 through the sliding contact 58 in engagement therewith. By periodically checking the saturation current of the space discharge device 11 in the manner described above and by maintaining this current at all times substantially constant, a substantially constant electron emissivity is insured.

For maintaining a substantially constant electron emissivity and a substantially constant voltage across one of the diagonals of the bridge circuit when desired, I have devised a novel regulatory system for regulating a fluctuating source of direct current electromotive force which, while of general application, may be advantageously utilized in the apparatus of the present invention. This regulatory system includes a fluctuating source of direct current electromotive force connected in circuit with a plurality of parallel branches and a branch across which there is maintained a substantially constant voltage drop by the regulatory action of the system. Means responsive to any current change in one parallel branch attending any fluctuation in the direct current electromotive force causes a substantially equal but opposite current change in the other parallel branch, whereby the current in the remaining circuit branch and hence the voltage drop thereacross is maintained substantially constant. By connecting the electron emissive electrode of the space discharge device in the latter or remaining circuit branch it will be energized by a substantially constant current at all times, thus maintaining its emissivity substantially constant. This latter circuit branch may also provide a substantially constant source of electromotive force for one diagonal of the bridge circuit when employing the apparatus for the measurement of torque as has already been noted at length hereinbefore.

The first of the parallel branches of the regulatory system includes a ballast tube 59 in series with the resistor 60. A resistor 61 may, if desired, be shunted across the ballast tube 59 to increase the current output of the shunted combination over that of the tube alone. The ballast tube 59 may be any conventional prior art tube and is shown here, by way of example, as including an envelope with a gaseous filling of hydrogen in which there is enclosed a ballast resistor 62 fabricated of iron wire connectible with the positive terminal of the fluctuating source of direct current electromotive force by closure of the switch 63.

The current voltage characteristic of the ballast tube 59 depicted in Fig. 3 of the drawings shows how the total turrent $I_1$ in the parallel branch described in the preceding paragraph varies in response to any voltage change in the fluctuating source of direct current electromotive force. It will be noted that within a limited range of voltage variation of the direct current source of electromotive force, that the current variation in the parallel branch is substantially linearly related to the varying voltage drop across the ballast tube and that this substantially linear current variation is from $I_{1'}$ to $I_{1''}$ where $I_1$, for convenience of exposition, may be taken as the quiescent value of current about which the current fluctuations or incremental current changes $\Delta I_1$ occur. Such a large current variation is not permissible where precision measurements are to be made with the power and/or torque meter since, among other things, wide changes in electron emissivity would ensue.

The second of the parallel branches includes one or more shunt connected tubes or space discharge devices which operate essentially as triodes. I have shown, by way of example, four RCA Type–48 tubes identified in general by the reference character 64 in which the screen grids are tied back to their respective anodes in each instance so that the tubes may operate as triodes. While any conventional prior art triode may be employed, this type of tube was chosen because of its ability to deliver large power at relatively low plate voltages.

The screen grids 65 tied to the anodes 66 are connected in shunt and to a terminal 67 of the first parallel branch by means of the conductor 68; while the indirectly heated cathodes 69 energized by the heater elements 70 are likewise shunt connected and by the conductor 71 are electrically connected to the remaining terminal 53 of the first parallel branch. The control grids 72 of the tubes 64 are also connected in shunt and have their grid circuits completed in a manner to be described more in detail hereinafter.

It is to be emphasized that the triodes 64 must at all times be operated substantially on the linear portions of their $i_p$–$e_g$ characteristic and that the control grids 72 must never swing positive with respect to their cathodes 69 so as to prevent any disturbance in the voltage relationships of the system. From the foregoing, it follows that any current change in the second of the parallel branches will be linearly related to any voltage change on the control grids 72 and that this branch current may by suitable adjustment have the desired compensating effect on the linearly varying current of the first parallel branch.

Thus, the number of tubes in the second parallel branch need only be sufficient to carry a current slightly in excess of the difference between the maximum and minimum linear currents of the difference between $I_1''$ and $I_1'$ of the first parallel branch. The tubes 64 must of necessity be capable of carrying a slight excess current since otherwise they would be operating on a non-linear portion of the $i_p$—$e_g$ characteristic at zero plate current which is not permissible if the conditions above noted are to be met. Therefore, even when the ballast tube is passing its maximum current a small current is passing through each of the tubes 64. The total quiescent current in the second parallel branch flowing toward the junction point 53 is designated $I_2$ and corresponds to the similarly flowing quiescent current $I_1$ of the first parallel branch.

The circuit branch across which it is desired to maintain a substantially constant voltage drop and hence a constant current flow therethrough extends from the junction point 53 to the grounded point 27. This latter junction point, it will be observed, is connected to the negative terminal of the fluctuating source of direct current electromotive force by the conductor 73. Thus, it should be clear that in the regulatory system of the present invention a fluctuating source of direct current electromotive force is connected in circuit with a plurality of parallel branches and a branch across which a substantially constant voltage drop is to be maintained.

This constant current, constant voltage branch 53—27 includes, by way of example, the resistors 74, 75, 76 and the filament resistor 13 in shunt with its variable resistor 57. The resistors 74 and 76 provide a constant voltage source for energizing the heater elements 70 and 71 respectively of the tubes 64 and the control tube 78. The energization of the heater elements 70 and 71 in the manner noted is of great importance since it insures a substantially constant electron emissivity of the cathodes in the tubes in question and hence a high degree of stability of the regulatory system. The resistor 75 is used to obtain the desired voltage drop across the constant voltage branch 53—27. A voltmeter 79 connected across the constant voltage branch indicates by a substantially constant reading that the system is operating as desired. The total current in the constant current branch flowing away from the junction point 53 is designated $I_3$.

In accordance with the present invention, the current $I_3$ in the branch 53—27 is maintained substantially constant attending a limited variation in the voltage of the fluctuating source of direct current electromotive force. This is achieved by causing a substantially equal but opposite current change in the second parallel branch simultaneously with and in response to a current change in the first parallel branch. Thus, before any current change takes place in the first parallel branch, an application of Kirchhoff's first law relating to networks at the junction point 53 gives the following equation:

$$I_1 + I_2 = I_3 \qquad \text{Eq. (1)}$$

After an incremental change of current $\Delta I_1$ in the first parallel branch attending a voltage fluctuation in the source of direct current electromotive force, the equation now applicable at the junction point 53 will be $$(I_1 + \Delta I_1) + (I_2 - \Delta I_2) \equiv I_1 + I_2 = I_3 \qquad \text{Eq. (2)}$$

since as postulated the accompanying incremental change in current of the second parallel branch, namely, $\Delta I_2$ must at all times be equal in magnitude to $\Delta I_1$ but opposite in sign. Thus, the current $I_3$ in the branch 53—27 and hence the voltage thereacross is maintained substantially constant within a limited range of voltage variation of the fluctuating source of direct current electromotive force, as nearly indicated in Fig. 4 of the drawings.

While the voltage across branch 53—27 is maintained substantially constant since the current therethrough and the equivalent resistance thereof are constant, the voltage across the series resistor 60 in the first parallel branch will vary attending any fluctuation of the current therein. This voltage variation across the resistor 60 occasioned by a current change in the first parallel branch provides the excitation for the control tube 78 of the voltage amplifier through which the proper voltages are applied to the grids 72 of the tubes 64 to cause a substantially equal but opposite current change in the second parallel branch. Thus, the desired regulation is achieved.

Proceeding now to a description of the voltage amplifier, I have shown, by way of example, a control tube 78 of the pentode type including an anode 80, cathode 81, control grid 82, screen grid 83 and suppressor grid 84 which latter grid is tied back to the cathode and both to one of the heater terminals at 85 in the conventional fashion. While a pentode tube such as an RCA Type 6J7 may advantageously be employed in the voltage amplifier because of its high amplification factor, I wish to emphasize in this connection that any conventional prior art triode may be used instead. A high amplification factor makes possible a low voltage excitation and hence a small value for the series resistor 60 in the first parallel branch. Hence, it may be said that the higher the amplification factor of the tube 78, the smaller may be the magnitude of the series resistor 60. In some instances, where this is desirable, the resistor 60 may even be omitted. Where omitted, however, the regulation will not be as critical as that depicted in Fig. 4 of the drawings but will be a vast improvement over that obtainable with a ballast tube alone.

A high ohmic resistor 86, which draws negligible current, is connected to a suitable point 87 along the series resistor 60 and to the cathode heater terminal 85 in the manner shown to form a potentiometer so that any desired portion of the variable voltage across the resistor 60 may be made available for excitation purposes in the grid circuit of the control tube 78. A sliding contact 88 engages the potentiometer resistor 86 and is secured to a suitable source of biasing voltage 89 for the control grid 82. This biasing voltage 89 is of such a value as to maintain the control grid 82 in its voltage excursions at all times negative with respect to the cathode 81 so as to insure substantially distortionless amplification and the preservation of the desired voltage relationships within the system.

A load resistor 90 of suitable value has one terminal 91 connected to the anode 80 of the tube 78 and to the grids 72 of the tubes 64 while the remaining terminal 92 thereof is connected to the screen grid 83 of the tube 78 and to a suitable point 93 along the series resistor 60. Thus, the grid circuit of each of the tubes 64 extends from the junction point 53 through the series resistor 60 to the junction point 93 and from thence by means of the conductor 94 to the terminal 92 of the load resistor 90; and from the remaining terminal 91 of this resistor through the conductor 95 to the grids 72 from whence the circuit is completed through the cathodes 69 and the conductor 71 to the initial junction point 53. The point 93 of the series resistor 60 to which the conductor 94 is secured is preferably chosen to give the best value of plate potential for the control tube 78. To have raised the plate potential of this tube excessively would have resulted in raising the mean potentials of the grids 72 of the tubes 64 to a point where a prohibitive positive grid swing might ensue under certain operating conditions. On the other hand, to have excessively lowered the plate potential of the tube 78 would have needlessly reduced the amplification of the voltage amplifier.

In operation, the main control switch 63 of the regulatory system is closed and the sliding contact 88 of the potentiometer is adjusted until the voltmeter 79 records a substantially constant voltage attending any fluctuation in the voltage of the direct current source of electromotive force. Under these circumstances, the desired current and voltage regulation in the branch 53—27 of the system is obtained. That this is so should be evident from the following discussion.

By adjustment of the sliding contact 88 of the potentiometer in the manner above noted, the needed portion of the variable voltage across the series resistor 60 of the first parallel branch attending any current change therein selected. This incremental change in voltage provides the excitation for the control grid 82 of the tube 78 and in amplified form appears across the load resistor 90. This amplified incremental voltage is of such a value as to change the voltage applied to the grids 72 of the tubes 64 in a manner such that $\Delta I_2$ will be equal in magnitude but opposite in sign to $\Delta I_1$, thus maintaining the constancy of $I_3$ in the branch 53—27 all in a manner pointed out hereinbefore.

More specifically, an increase of current $\Delta I_1$ in the first parallel branch will cause the grid 82 of the control tube 78 to become less negative by a certain amount with respect to its cathode 81. This causes an increase in plate current through the tube 78 and hence an increase in voltage drop through the load resistor 90. Since, however, the control grids 72 of the tubes 64 are connected to the terminal 91 of the load resistor 90 by means of the conductor 95, this increase in voltage drop has the effect of causing these grids to become more negative with respect to their cathodes 69. The swing of the individual grids 72, however, is only great enough to cause a decrease of $\Delta I_2$ in the total current of the second parallel branch equal to the increase of $\Delta I_1$ in the total current of the first parallel branch. Thus, the desired regulation is achieved. That a decrease in current in the first parallel branch will through the voltage drop in the series resistor 60, the associated control tube 78 and load resistor 90 cause an increase in current of the same magnitude in the second parallel branch is believed to be evident.

It is desirable that provision be made for energizing the cathode 13 of the space discharge device 11 only after the regulatory system has attained stability so as to avoid any possible impairment of the cathode due to excessive current energization. While this may be achieved manually by simply shorting out the cathode for a predetermined time through suitable circuit connections, I have devised means for automatically achieving the foregoing. A switch 96 under the control of the solenoid 97 is maintained in a closed position when the solenoid is deenergized by means of a spring 98; and in its closed position, by virtue of its connection to the cathode energizing conductors 37 and 73 through the conductors 99 and 100 respectively, short circuits the cathode 13 thus preventing any passage of current therethrough. Any convenient means may be employed for energizing the solenoid 97 when the regulatory system has attained stability, which in consequence of the energization has the effect of opening the switch 96 and thus permitting current flow through the cathode 13 of the space discharge device 11 so long as the main control switch 63 of the regulatory system is closed.

I have illustrated, by way of example, an instrumentality identified in general by the reference character 101 for achieving the desired energization of the solenoid 97. This instrumentality is connected across the source of direct current electromotive force by means of the conductors 102 and 103 in the manner shown and is set in operation by the closure of the main circuit switch 63. In its initial and unenergized state, the movable contact 104 of the current bow 105 engages the fixed current contact 106; and the movable solenoid contact 107 is in engagement with the fixed contact 108 of the heating resistor 109 cooperating with current bow 105. Upon closure of the switch 63, a heating circuit is completed from the positive terminal of the source of electromotive force through the conductors 103 and 110 to the movable solenoid contact 107 and from thence through the fixed contact 108, heating resistor 109 and conductor 102 to the negative terminal of the voltage source. Immediately upon closure of this heating circuit, the movable contact 104, due to the heating of the current bow 105, disengages the fixed contact 106 and slowly moves to the right for subsequent engagement with the fixed contact 111.

The engagement of the movable contact 104 with the fixed contact 111 completes a circuit through the solenoid 112 which extends from the positive terminal of the source of electromotive force through the conductor 103, current bow 105, solenoid 112 and conductor 102 to the negative source terminal with the result that the movable solenoid contact 107 is moved from engagement with its fixed contact 108 to cause an interruption of the heating circuit heretofore described and into engagement with a second fixed contact 113. By engagement of the movable solenoid contact 107 with the contact 113, a holding circuit for the movable contact 107 is completed from the positive terminal of the source of electromotive force through the conductors 103 and 110 to the movable contact 107 and from thence through the fixed contact 113, solenoid 112 and conductor 102 to the other terminal of the voltage source. This holding circuit is maintained so long as the main control switch 63 is closed.

As the heating circuit hereinbefore described has now been interrupted, the movable contact 104 of the current bow 105 gradually moves from engagement with its fixed contact 111 back toward the fixed contact 106. Upon engagement with the fixed contact 106 the energizing circuit for the solenoid 97 is completed. This circuit extends from the positive terminal of the source of electromotive force through the conductors 103, 110, movable solenoid contact 107 and fixed contact 113 to one side of the current bow 105. The circuit continues through the current bow 105, movable contact 104, fixed contact 106, and conductor 114 to one side of the solenoid 97 and from thence through the solenoid and conductor 100 to the conductor 73 which is connected to the negative and remaining terminal of the voltage source.

Thus, after a predetermined time interval has elapsed subsequent to the closure of the main control switch 63, the solenoid 97 is energized. The regulatory system having by this time attained stability, the energization of the solenoid 97 causes an opening of the switch 96 with the result that the cathode 13 of the space discharge device 11 is now energized. The time delay in the energization of the cathode is entirely automatic and energization occurs only after the regulatory system has attained stability so that any possibility of damage to the cathode is effectively avoided.

According to the provisions of the patent statutes, I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and manufactured by or for the Government of the United States of America for governmental purposes without the payment of any royalties thereon or therefor.

What I claim is:

1. In a regulatory system, a fluctuating source of direct current electromotive force, a first resistor, a second resistor and a ballast resistor connected in series relation with the aforesaid source of electromotive force, at least one space discharge device including an anode, cathode and grid connected in parallel with said ballast resistor and said first mentioned resistor to thus form two parallel branches in the regulatory system, a second space discharge device for control purposes and including an anode, cathode and grid, the grid of said second mentioned device being electrically connected to a point on the first mentioned resistor and being at all times maintained at a negative potential with respect to its cooperating cathode, a load resistor in circuit with said second mentioned device, the grid of said first mentioned device being connected to the anode of said second mentioned device and being at all times maintained at a negative potential with respect to its cooperating cathode, the two parallel branches being so arranged that any change in current in one branch attending any fluctuation in the electromotive force acts through the voltage drop in the first mentioned resistor, the associated control device and load resistor to cause a substantially equal but opposite change in current through the other parallel branch, whereby the current in the second mentioned resistor is maintained substantially constant.

2. In a regulatory system, a fluctuating source of direct current electromotive force, a resistor and a plurality of parallel branches connected in circuit with the aforesaid source of electromotive force, one of said parallel branches including a ballast resistor and the other of said parallel branches including at least one space discharge device incorporating an anode, cathode and grid, and means responsive to any current change in one parallel branch attending any fluctuation in the said electromotive force for causing a substantially equal but opposite current change in the other parallel branch by controlling the grid of the space discharge device therein, whereby the current in the first mentioned resistor is controlled as desired.

3. In a regulatory system, a fluctuating source of direct current electromotive force, a plurality of parallel branches and a branch across which it is desired to control the voltage drop connected in circuit with the aforesaid source of electromotive force, one of said parallel branches including a ballast resistor and the other of said parallel branches including at least one space discharge device incorporating an anode, cathode and grid, and means responsive to any current change in the parallel branch including the ballast resistor for causing a substantially equal but opposite current change in the other parallel branch by controlling the grid of the space discharge device therein whereby the voltage drop across the remaining circuit branch is controlled as desired.

4. In a regulatory system, a fluctuating source of direct current electromotive force, a resistor and a plurality of parallel branches connected in circuit with the aforesaid source of electromotive force, one of said parallel branches including a ballast resistor and a resistor in series therewith and the other of said parallel branches including at least one space discharge device incorporating an anode, cathode and grid, and means responsive to any current change in one parallel branch attending any fluctuation in the said electromotive force for causing a substantially equal but opposite current change in the other parallel branch, whereby the current in the first mentioned resistor is maintained substantially constant, the said means being electrically connected to the series resistor in one of the parallel branches and to the grid of the space discharge device in the other of said branches.

5. In a regulatory system, a fluctuating source of direct current electromotive force, a plurality of parallel branches and a branch across which it is desired to maintain a substantially constant voltage drop connected in circuit with the aforesaid source of electromotive force, one of said parallel branches including a ballast resistor and a resistor in series therewith and the other of said parallel branches including at least one space discharge device incorporating an anode, cathode and grid, and means responsive to any current change in one parallel branch attending any fluctuation in the said electromotive force for causing a substantially equal but opposite current change in the other parallel branch, whereby the voltage drop across the remaining circuit branch is maintained substantially constant, the said means being electrically connected to the series resistor in one of the parallel branches and to the grid of the space discharge device in the other of said parallel branches.

6. In a regulatory system, a fluctuating source of direct current electromotive force, a resistor and a plurality of parallel branches connected in circuit with the aforesaid source of electromotive force, one of said parallel branches including a ballast resistor and a resistor in series therewith and the other of said parallel branches including at least one space discharge device incorporating an anode, cathode and grid, and means responsive to any current change in one parallel branch attending any fluctuation in the said electromotive force for causing a substantially equal but opposite current change in the other parallel branch, whereby the current in the first mentioned resistor is maintained substantially constant, the said means including a second space discharge device incorporating an anode, cathode and grid, the grid of said second mentioned device being electrically connected to a point on the series resistor and being at all times maintained at a negative potential with respect to its cooperating cathode and the grid of said first mentioned device being connected to the anode of said second mentioned device and being also at all times maintained at a negative potential with respect to its cooperating cathode.

7. In a regulatory system, a fluctuating source of direct current electromotive force, a plurality of parallel branches and a branch across which it is desired to maintain a substantially constant voltage drop connected in circuit with the aforesaid source of electromotive force, one of said parallel branches including a ballast resistor and a resistor in series therewith and the other of said parallel branches including at least one space discharge device incorporating an anode, cathode and grid, and means responsive to any current change in one parallel branch attending any fluctuation in the said electromotive force for causing a substantially equal but opposite current change in the other parallel branch, whereby the voltage drop across the remaining circuit branch is maintained substantially constant, the said means including a second space discharge device incorporating an anode, cathode and grid, the grid of said second mentioned device being electrically connected to a point on the series resistor and being at all times maintained at a negative potential with respect to its cooperating cathode and the grid of said first mentioned device being connected to the anode of said second mentioned device and being also at all times maintained at a negative potential with respect to its cooperating cathode.

8. In a regulatory system, a fluctuating source of direct current electromotive force, a plurality of parallel branches and a branch across which it is desired to maintain a substantially constant voltage drop connected in circuit with the aforesaid source of electromotive force, one of said parallel branches including a ballast resistor and a resistor in series therewith and the other of said parallel branches including at least one space discharge device incorporating an anode, cathode and grid, and means responsive to any current change in one parallel branch attending any fluctuation in the said electromotive force for causing a substantially equal but opposite current change in the other parallel branch, whereby the voltage drop across the remaining circuit branch is maintained substantially constant, the said means including a second space discharge device incorporating an anode, cathode and grid and a load resistor in circuit therewith, the grid of said second mentioned device being electrically connected to a point on the series resistor and being at all times maintained at a negative potential with respect to its cooperating cathode and the grid of said first mentioned device being connected to the anode of said second mentioned device and being also at all times maintained at a negative potential with respect to its cooperating cathode.

9. In a regulatory system, a fluctuating source of direct current electromotive force, a plurality of parallel branches and a branch across which it is desired to control the voltage drop connected in circuit with the aforesaid source of electromotive force, one of said parallel branches including a ballast resistor, and means responsive to any current change in the parallel branch including the ballast resistor for causing a substantially equal but opposite current change in the other parallel branch, whereby the voltage drop across the remaining circuit branch is controlled as desired.

WAYNE C. HALL.